United States Patent Office 3,608,351
Patented Sept. 28, 1971

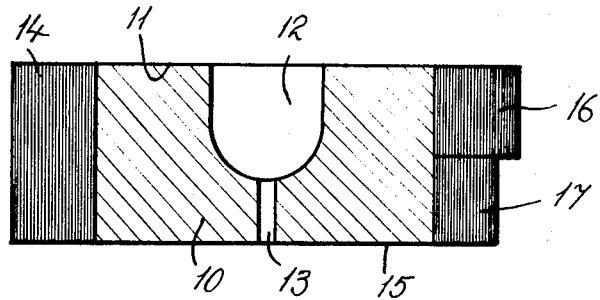
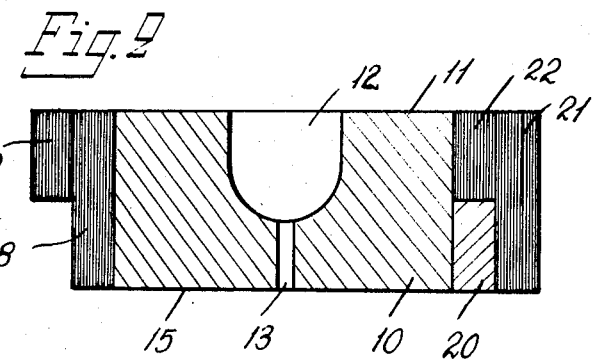

3,608,351
REINFORCED MOULD AND METHOD AND APPARATUS FOR REINFORCING SAID MOULD
Per-Olof Strandell, Bockstigen 3, Nasbypark, Sweden
Filed Feb. 5, 1969, Ser. No. 796,852
Claims priority, application Sweden, Feb. 7, 1968,
1,619/68
Int. Cl. B21c 3/00
U.S. Cl. 72—467                                      7 Claims

ABSTRACT OF THE DISCLOSURE

There is provided a mould which has been reinforced by means of a novel method and apparatus. The mould reinforcement comprises at least one winding of thin strip-like material of only some few tenths of a millimetre thick, and in which the whole of the bottom face of each successive turn of a winding of strip material is in abutment with the upper face of the preceding turn of said winding. In the case of moulds subjected to loads which vary along the length of the mould core, the novel method and apparatus permit differing degrees of reinforcement pre-tensioning corresponding to said load variations along the mould core.

---

The present invention relates to moulds of the type which include a core presenting a mould cavity or matrix in at least one end surface thereof, and a pre-stressed reinforcement which surrounds the core along at least a portion of its length. The invention is also concerned with a method and apparatus for reinforcing moulds of the type mentioned. The term mould as used here and in the following includes any tool in which materials are formed or shaped.

Moulds used to shape materials by plastic deformation processes, such as pressure moulding, extrusion, drawing and press forging for instance, are normally subjected to very high loads. A common method of relieving the strain on the moulds is to reinforce them by shrinking one or more support rings onto the mould core. The support rings subject the mould, when in use, to tangential and radial compression forces, seen in relation to a symmetry axis normally extending perpendicular to the mould surface in which the cavity is disposed, thus reducing the tension forces which occur during a working sequence to innocuous or acceptable levels. In the case of moulds liable to experience very high stresses, two or more concentric rings are used, which permit a higher degree of pre-tensioning than when only one ring is used. The maximum pre-tension is determined by the maximum permissible tension at the inner surface of the inner support ring. Both the mould and support rings must be manufactured with high precision to obtain the calculated pre-tension when shrinking the rings onto the mould. Consequently, the mould and rings are relatively expensive to manufacture, which from an economical point of view, places a restriction on the number of rings used. The principal object of the present invention is to provide a mould reinforcement which is not subjected to the aforementioned disadvantages, and which imparts a considerably improved pre-tensioning of the mould while utilizing the reinforcing material to the fullest.

This object is achieved by means of the reinforced mould according to the invention, which is mainly characterized in that the mould reinforcement comprises at least one winding of strip material having a thickness of at most some few tenths of a millimetre, and that the whole of the bottom face of each turn of a winding is in abutment with the upper face of the preceding turn of said winding. The use of such a thin band enables the band, when wrapping it around the core of the mould, to be brought into intimate contact with the outer periphery of said core and the outside of the preceding turn of the winding simply by stretching said band, whereby radial and tangential tension and compression forces are transferred directly between the core and the winding or windings and between the different turns of said winding and windings. As mentioned above, the thickness of the band is at most some few tenths of a millimetre, although extremely thin bands may be used to advantage. For instance, favourable results have been obtained when reinforcing moulds with high-strength steel bands having a thickness in the region of 0.03 mm. The thickness of the strip material used in the reinforcement of the invention suitably lies below 0.4 mm, preferably below 0.2 mm. However, the thickness of the strip material should preferably not be less than 0.01 mm. and suitably exceeds 0.02 mm. A suitable reinforcing material is for instance steel strip hardened to bianite structure which is endowed with high tensile strength combined with a high degree of toughness, although other material of high tensile strength and preferably also a relative degree of toughness can also be used.

When winding the band of reinforcing material onto the mould core, the tension created in the band is controlled to and maintained at a level which suitably lies in the proximity of the yield point of the band. When the reinforcement comprises a very thin band each winding can be started by placing a turn around the core of the mould and then applying tension to the band and increasing the tension successively for a few turns until the desired tension is obtained; this desired tension is then preferably maintained constant during continued winding of the band. It is also possible to secure the innermost turn of the winding or the end of the band to the mould core or to a winding upon which a further winding is about to be wound, by means of a suitable metal adhesive, whereupon, subsequent to the adhesive hardening, winding of the strip can be effected immediately at the desired tension. Winding is continued until the number of turns required to obtain the desired degree of pre-tensioning of the mould has been reached. Since the winding in principle comprises a very large number of very thin-walled rings, the reinforcing material is utilized more effectively than in conventional methods. This enables moulds to be pre-tensioned to the desired extent while reducing the external diameter thereof, with respect to moulds reinforced by conventional methods, which is of great advantage when the space accommodating the mould is restricted.

Since the inner turns of the winding and the mould core are subjected to small compression loads with each new turn of the winding, the load on the inner turns is successively relieved during continued winding of the core reinforcement. This lightening of the load on the inner turns provides latitude for absorption of the superimposed stresses arising during the loading cycle and permits pre-tensioning of the band to be effected with higher loads than in conventional methods. If the reinforced mould according to the invention is subjected to overloads, the extent of elongation of the winding or windings and the extent to which tension therein is relieved is very slight, and hence the mould reinforcement and core are not liable to damage as a result of overloading, as is the case when practicing conventional pretensioning methods. When the requisite number of turns have been wound onto the mould, the band is cut and the loose end thereof can be simply attached to the mould, e.g. by means of a piece of adhesive tape.

When applying the reinforcement of the invention it is not necessary to surface finish the outer surface of the core. The reinforcement can be wound, for instance, directly onto a cast or sintered mould body, thus greatly reducing the cost of manufacturing the mould. Subsequent to winding the band onto the core, one or both end surfaces of the reinforced mould can be adjusted by grinding, polishing or the like. Accordingly, in order to obtain a smooth abutment surface it is advantageous, when winding the band, to let one or both edge portions of said band project beyond its or their respective end surfaces of the mould core.

When the mould is in use, the stresses caused therein normally vary greatly in an axial direction. The reinforcing method according to the invention permits the mould to be pre-tensioned to varying degrees along the length of the mould core in accordance with the load to be placed thereon.

The variations in tension on the mould core in regions of the mould subjected to higher loads than other regions thereof can be compensated for by reinforcing such regions with at least one winding wound to a greater number of turns than the winding or windings in other regions, and/or when wrapping the band around the core stretching the band in said region of higher stress to a greater extent than in said other regions—optionally using a material of greater mechanical strength than the band material used in other windings—and or by applying one or more extra external windings to said regions of higher stress. Furthermore, if, for instance, it is desired to pre-tension a portion of the mould core to a lesser extent, an insert member which may be slotted or sectioned for instance can be placed about this portion to transfer pre-tensioning forces from at least one outer band winding surrounding at least said insert. The thickness of the insert or inserts is selected according to the desired differences in pre-tensioning. The extent of the pre-tensioning can be varied in stages along the mould core by using inserts of different thicknesses.

When compared with conventional embodiments, the reinforcement of the invention provides the following advantages:

Substantial lower manufacturing costs; obviates close tolerances with regard to the mould core and reinforcing material. Higher pre-tension forces are obtained. The mould can be given a smaller total external diameter than when using conventional methods. Reinforcing materials of very high mechanical strength can be used, and the strength of the material can be utilized more effectively. The amount of pre-tensioning can be varied axially in a simple manner. The cross-sectional shape of the mould may be non-round.

The invention will now be described with reference to a number of embodiments shown diagrammatically in the accompanying drawing, additional characteristic features of the invention being disclosed in conjunction therewith.

FIG. 1 shows an axial section through a mould and illustrates different methods of reinforcing the mould in accordance with the invention, to the right and to the left of the figure. FIG. 2 shows a similar view to that shown in FIG. 1 and illustrates to the left and to the right of the figure two further methods of reinforcing the mould in accordance wih the invention, while FIG. 3 is a plan view, partly in section, of an apparatus for reinforcing the mould in accordance with the invention.

FIGS. 1 to 3 show diagrammatically a mould core 10, which at one end surface 11 presents a mould cavity or matrix 12. Extending from the bottom of the cavity, axially through the core 10, is a bore 13 intended to accommodate an ejector pin, not shown. Arranged around the core 10, which preferably has a cylindrical cross-section but which may have other cross-sectional shapes than circular, is a reinforcement comprising one or more windings of thin strip material. In the exemplary embodiment the strip material is of uniform width along the whole of its length, although in some instances its width may decrease longitudinally of the band. Holes and other devices applied in conjunction with the mould to facilitate the positioning thereof in a moulding apparatus, such as a foundry press, have been excluded for the sake of clarity.

On the left of FIG. 1 is shown a reinforcement, which comprises a winding 14 of thin strip material. The band is sufficiently wide to permit it to extend across the whole axial length of the mould, that is fron the end surface 11 presenting the cavity 12 to the opposite end surface 15. The winding 14 is adapted to take up the highest tangential and radial stresses occurring at the surface 11 of the core 10. It is, however, within the scope of invention to apply to the mould in those regions thereof subjected to higher loads than other regions thereof when in use, windings having more turns than the winding or windings in other regions, or to apply one or more extra, external windings. Such embodiments are shown to the right in FIG. 1 and to the left in FIG. 2. Thus, there is shown to the right of FIG. 1 a reinforcement comprising two windings 16 and 17, the winding 16 situated nearest the end surface 11 having more turns than the winding 17. In another embodiment, not shown, the core 10 is not reinforced about the region thereof subjected to the smallest stresses, i.e. the region nearest the end surface 15 in FIG. 1. A reinforcement comprising two windings 18 and 19 is shown to the right in FIG. 2, wherein the winding 18, which covers the core 10 along the whole of the axial length thereof, is itself surrounded by the extra, external winding 19 at the regions most subjected to load. It is also within the scope of the invention to arrange for reasons of mechanical strength and/or practical and/or economic reasons, more than two windings. It is also within the scope of the invention to arrange in regions subjected to very heavy loads, one or more windings of strip material which has been pre-tensioned to a higher degree and/or has a higher mechanical strength than the strip material in any other winding.

In order to provide the mould with a flat outer surface in spite of the different thickness of the reinforcing windings along the axial length of said mould, it is possible, as shown to the right in FIG. 2, to place an insert 20 in the regions of the mould subjected to lower stresses than other regions thereof, so as to transfer pre-tension forces from an outer winding 21 surrounding said insert. In addition to encircling the inset 20, the winding 21 also encircles a winding 22 placed around the portion of the core 10 most subjected to load, said winding 22 having the same thickness as the insert 20. The insert 20 may, to advantage, be a slotted ring or may comprise one or more separate ring sections.

FIG. 3 shows an apparatus for reinforcing moulds according to the invention. The apparatus includes means 23 for mounting the mould core 10 for rotation about an axis which extends substantially perpendicular to the end surface 11; a motor 24 or other means, such as a crank, for rotating the mould in its mounting; holding means, such as a rotatably mounted drum 25, for a store 26 in the form of a reel of thin strip material; and means 27 for maintaining a controlled, regulatable tension in the strip material issuing from the supply 26 whilst being wound onto the core 10 during its rotation.

The core mounting means 23 includes two coaxial securing means 29 and 30 which are journalled for rotation in a frame 28 and which are adapted to be urged against their respective end surfaces of the core 10. The member 29 is drivably connected to the motor 24 and can not be moved axially, while the member 30 is freely rotatable and journalled for axial movement, so that by means of a nut 33, operative between an axial bearing 31 and a threaded part 32 of said member 30, the member 30 can be moved axially towards the member 29, to clamp the core 10. The member 30 is locked in the core-clamping position by means of a locking nut 34. The core 10 is held in position by the friction acting between its end surfaces and the members 29 and 30. The members 29, 30 may also be provided with axial projections to enable the core 10 to be centered on the common axis of rotation of said members.

In the exemplary embodiment, the means 27 is an electric brake motor acting on the drum 25 and which may be provided with known devices for adjusting the desired braking effect and thus the desired band tension. In an alternative embodiment, the desired tension in the band can be maintained instead by a brake device acting directly on the band material. Although winding can be effected with apparatus other than that shown, it is typical of the inventive concept that winding can be effected with very simple equipment, since the tension forces created in the band material during winding are relatively small. For instance in the case of a cylindrical mould having a diameter of 50 mm. and an axial length of 50 mm. it is possible to use to advantage a steel band having a width of 50 mm. and a thickness of 0.05 mm. and to apply a tension of 160 kg./mm.$^2$ when winding said band to the core, wherewith the total tension in the band reaches only 400 kp.

The invention is not restricted to the embodiment shown and described, but can be varied within the scope of the following claims.

What I claim is:

1. A mould having a core presenting a mould cavity in at least one end surface thereof and a pre-tensioned reinforcement surrounding the core at least along a portion of its length, the reinforcement comprising at least one winding of strip material which has a thickness of at most 0.5 millimeter and in that the whole of the inner face of each turn of a winding is in abutment with the outer face of the preceding turn of said winding.

2. A mould according to claim 1 in which there is arranged in regions thereof which are subjected to higher stresses than other regions thereof at least one winding having more turns than the windings in other regions.

3. A mould according to claim 1 in which there is arranged in regions thereof which are subjected to higher stresses than other regions thereof one or more windings of stretched material which has been pre-tensioned to a higher degree and/or has a higher mechanical strength than the strip material in any other winding.

4. A mould according to claim 1 in which there is arranged in regions thereof which are subjected to higher stresses than other regions thereof at least one extra, external winding.

5. A mould according to claim 1 in which there is arranged adjacent the core in regions of said mould which are subjected to lower stresses than other regions thereof an insert adapted to transfer pre-tensioned forces from at least one external band winding surrounding at least the insert.

6. A mould according to claim 5 in which the insert is a slotted ring.

7. A mould according to claim 5 in which the insert comprises a plurality of separate ring sections.

References Cited
UNITED STATES PATENTS

| | | | |
|---|---|---|---|
| 3,423,794 | 1/1969 | Wilson | 18—16.5 |
| 3,436,952 | 4/1969 | Hajikano | 72—467 |
| 3,461,507 | 8/1969 | Rice | 18—34 |

MILTON S. MEHR, Primary Examiner

U.S. Cl. X.R.

18—34